United States Patent [19]
Shutt, Jr. et al.

[11] 3,730,502
[45] May 1, 1973

[54] APPARATUS FOR VACUUM BRAZING-GAS QUENCHING NON-FERROUS AND FERROUS ALLOYS

[75] Inventors: Paul K. Shutt, Jr., Aberdeen; Francis B. Gurtner, Baltimore; Frank T. Kirk, Forest Hill, all of Md.

[73] Assignee: The United States of America as represented by the Secretary of the Army

[22] Filed: May 21, 1971

[21] Appl. No.: 145,661

Related U.S. Application Data

[62] Division of Ser. No. 816,697, April 16, 1969, Pat. No. 3,608,187.

[52] U.S. Cl. ................................266/5 R, 148/144
[51] Int. Cl. ..............................................C21d 1/00
[58] Field of Search....................266/5 R, 5 A, 5 B, 266/5 C, 34 V; 110/173 R, 173 C; 148/144

[56] References Cited

UNITED STATES PATENTS

| 3,438,618 | 4/1969 | Seelandt | 266/5 R |
| 3,112,919 | 12/1963 | Gunow | 266/5 R |
| 1,961,766 | 6/1934 | Jennings | 266/5 A |
| 3,171,759 | 3/1965 | Glenn | 266/5 C |
| 3,219,331 | 11/1965 | Ipsen | 266/5 C |
| 3,565,410 | 2/1971 | Scherff | 266/5 C |

*Primary Examiner*—Gerald A. Dost
*Attorney*—Edward J. Kelly

[57] ABSTRACT

The invention relates to an apparatus for joining metal parts together through the utilization of a vacuum brazing - gas quenching technique.

5 Claims, 7 Drawing Figures

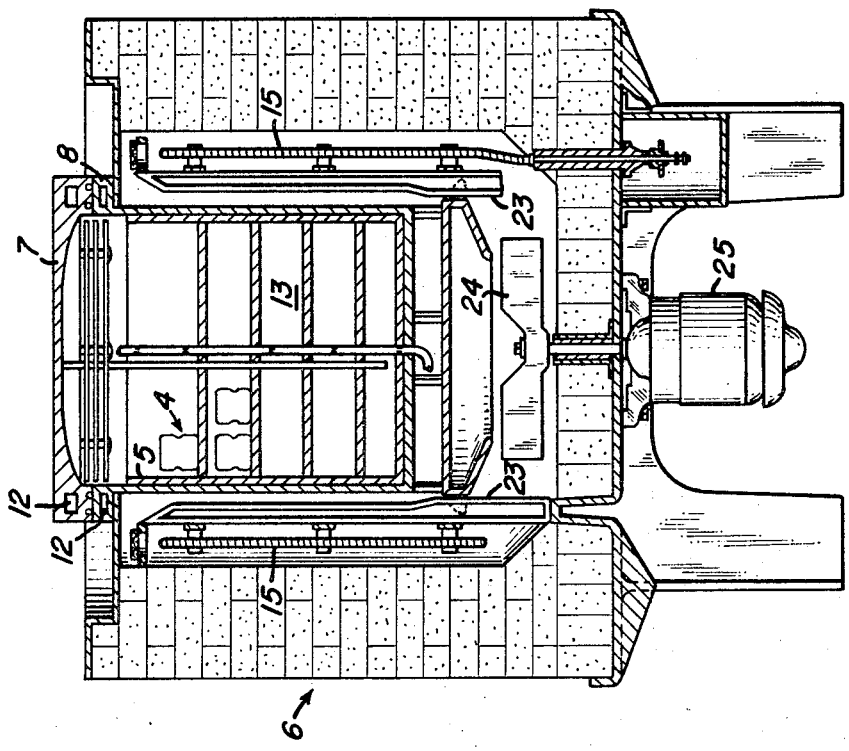
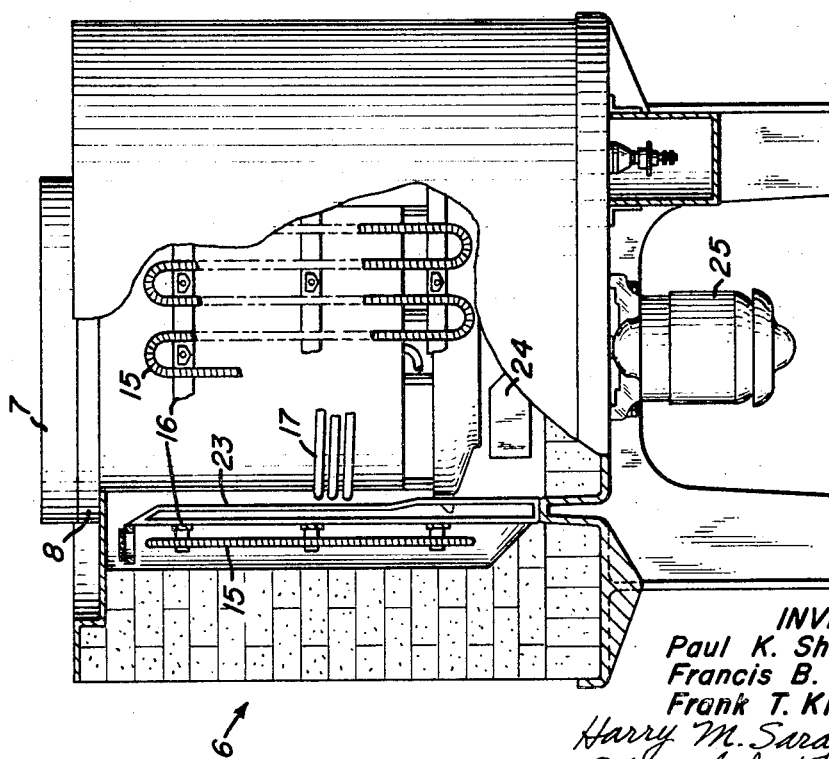
INVENTORS
Paul K. Shutt, Jr.
Francis B. Gurtner
Frank T. Kirk, Jr.

INVENTORS
Paul K. Shutt, Jr.
Francis B. Gurtner
Frank T. Kirk, Jr.

BY *Harry M. Saragovitz*
*Edward J. Kelly*
*Herbert Berl*
*Bernard J. Ohlendorf*
ATTORNEYS

APPARATUS FOR VACUUM BRAZING-GAS QUENCHING NON-FERROUS AND FERROUS ALLOYS

This application is a divisional application of our pending U.S. Pat. application Ser. No. 816,697 filed 16 April 1969 now U.S. Pat. No. 3,608,187 issued Sept. 28, 1971.

DEDICATORY CLAUSE

The invention described herein may be manufactured, used, and licensed by or for the Government for governmental purposes without the payment to me of any royalty thereon.

Our invention relates to an apparatus for joining metal components through the utilization of a vacuum brazing — gas quenching technique and apparatus.

As more and more new metals are being developed, such as the superalloy and refractory-type metals, as stated in the *Welding Journal*, May, 1967, page 423, Article titled *Vacuum (or Fluxless) Brazing - Gas Quenching of 6061 Aluminum Alloy* by M. M. Schwartz, F. B. Gurtner, and P. K. Shutt, Jr.; the potentials and capabilities of prior art joining techniques, such as welding, etc., are being challenged by present-day technology.

A problem has long existed in providing munitions containing toxic agents with a leak-tight assembly means due to oxide formation and contamination and corrosive damage, and our invention was conceived and reduced to practice to solve the assembly problem.

A principal object of our invention is to provide an apparatus for joining metal components which eliminates oxide, hydrate, or hydroxide formation and contamination during the joining process.

Another object of our invention is to provide an apparatus for joining metal components which eliminate the need for using a flux and the corrosive damage caused by flux.

Other objects of our invention will be obvious or will appear from the specification hereinafter set forth.

FIG. 1 is a view of our apparatus showing the annular heating and cooling systems.

FIG. 2 is a view of our apparatus showing a container therein holding munitions to have the metal components thereof joined by our method.

Our invention and FIGS. 1 to 7 will now be described in detail as follows.

Figure 3:
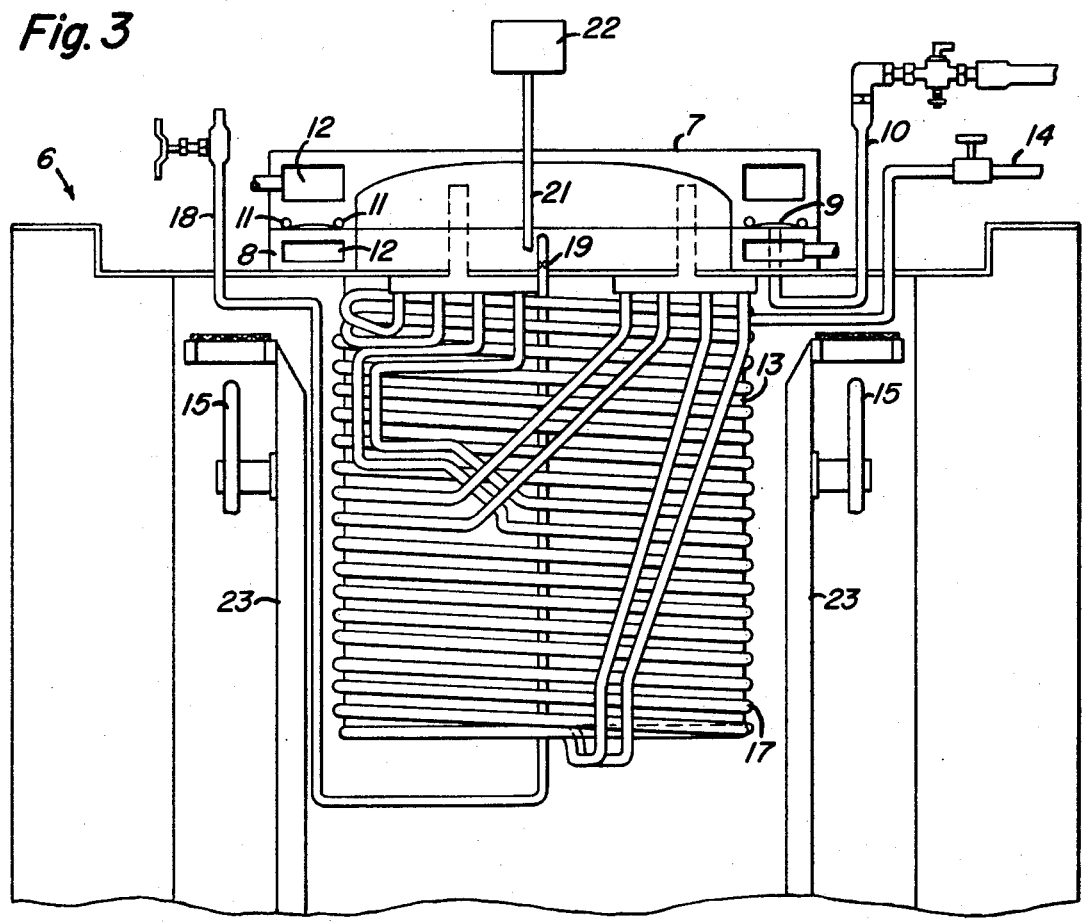
FIG. 3 is a detailed view of our apparatus showing the cover suction closure system and cooling system and details of the apparatus cooling system, heating system, and quenching system.
Figure 5:
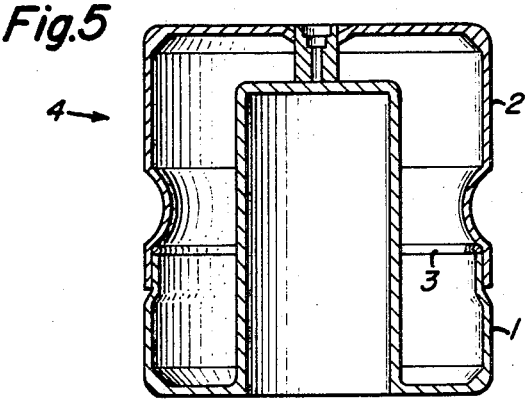
FIG. 5 is a view of a munition embodiment having one metal component thereof nested within another metal component thereof to form an annular recess and a ring of fluxless brazing composition within the recess.
Figure 4:
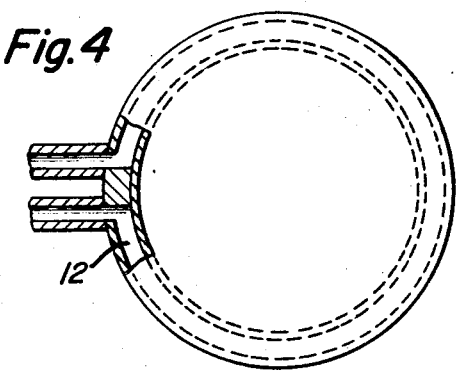
FIG. 4 is a view of the cover cooling system.
Figure 6:
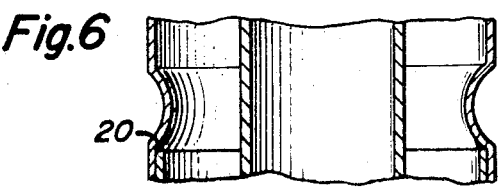
FIG. 6 is a view of the components in FIG. 5 joined together after utilization of our vacuum brazing — gas quenching apparatus.
Figure 7:
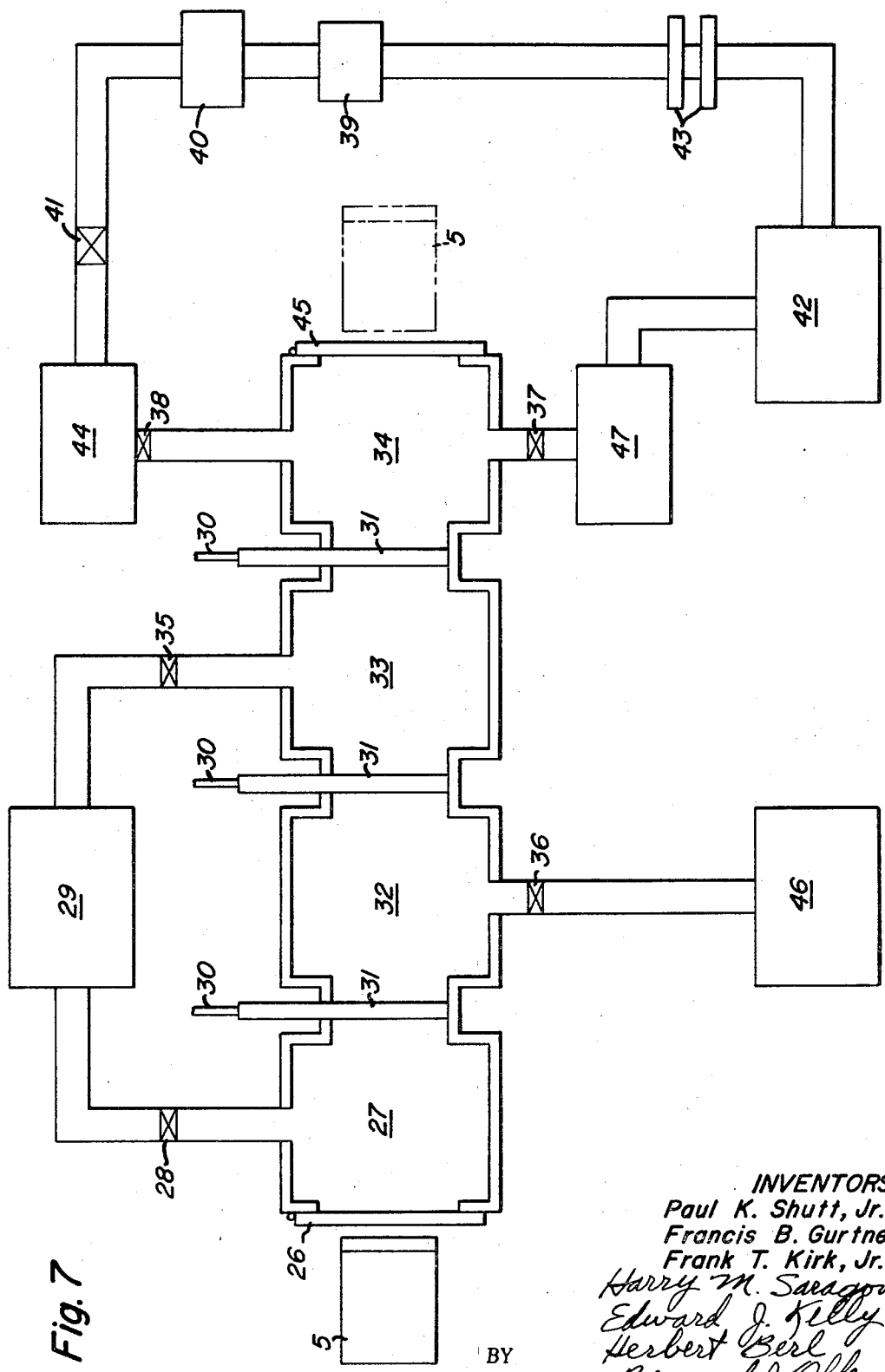
FIG. 7 is a schematic diagram of a production system using our vacuum brazing — gas quenching apparatus.

After any necessary chemical cleaning of the components to be vacuum brazed together in the conventional manner, such as by vapor degreasing, alkaline cleaning, or acid cleaning, the components are arranged together with the braze alloy, which can be any composition required for the particular application, in place at the location where the components are to be joined together, such as shown in FIG. 5. Component 1, in FIG. 5, is nested within component 2 and an annular braze alloy 3 is placed around the edge of component 1 which is nested within component 2 prior to the nesting within component 2 to form metal assembly 4. Metal component assembly 4 is then placed in our vacuum furnace — gas quenching apparatus shown at 6 in FIGS. 1 to 3. Disc cover 7 is then placed on annular flange 8 of our apparatus 6, and recess 9, as shown in FIG. 3, is evacuated by means of vacuum line 10 connected to a vacuum pump, not shown in the drawing, in the conventional manner until a leak-tight seal is produced between cover 7 and flange 8. O-rings 11 enable producing the vacuum to cause sufficient vacuum to accomplish the necessary leak-proof seal. A cooling circulation system 12 is provided in cover 7 and flange 8, as shown in FIGS. 2 and 3 and in detail in FIG. 4, for circulation of cooling fluid, which may be any conventional medium such as water, suitable for the particular application and temperature utilized, through flange 8 and cover 7 to avoid deterioration of O-rings 11 and stresses in cover 7 and flange 8. Loading space 13, which contains the perforated container which contains assemblies 4, as shown in FIGS. 2 and 3, is evacuated by means of vacuum line 14, as shown in FIG. 3, connected to a vacuum pump, not shown in the drawing, in the conventional manner to the range of $1 \times 10^{-4}$ to $1 \times 10^{-7}$ Torr. Energy is then supplied from an electrical source, not shown in the drawing, in the conventional manner to annular heating coils fixedly mounted to support means 23 by heater mounts 23 to heat loading space 13 to a suitable temperature for the particular application in the range of 900° F to 3,000° F, depending on the particular braze alloy composition utilized and the particular metal to be joined, to enable converting the braze alloy from the solid to the molten state. Load space 13 is held at the particular predetermined temperature within the 900° F to 3,000° F temperature range for 5 minutes to 15 minutes, depending on the amount of load being worked upon, electrical energy being supplied to coils 15 and cooling fluid, such as water or air, is passed through coils 17 until the temperature of space 13 drops to 700° F to 1,550°F, depending on the brazing temperature utilized in the 900° F to 3,000° F brazing temperature range. When the particular temperature for the particular application and material worked upon in the 700° F to 1,550° F range has been reached, quenching gas, such as $CO_2$ or any inert gas, is circulated through conduit 18, as shown in FIG. 3, from a gas supply source, not shown in the drawing, and distributed into space 13 by means of 15 1/16 inches diameter orifices 19, as shown in FIG. 3, evenly distributed along the conduit 18 with space 13. The quenching gas circulation continues for 1 minute to fuse component 1 to component 2 and form joint 20, as shown in FIG. 6. At the end of the quenching cycle, the cooling fluid circulation is stopped, the quenching gas circulation cut off, the vacuum pumps shut down, space 13 and recess 9 exhausted to the atmosphere, cover 7 removed from apparatus 6, and container 5 with brazed assemblies 4 therein removed from space 13. The above described temperatures are monitored by any conventional means, such as thermocouple 21, as shown in FIG. 3, having the joint of the two metals located at the center of space 13 and the opposite ends connected to recorder 22. Uniform heating and cooling throughout load space 13 is provided by circulation fan 24, as shown in FIGS. 1 and 2, activated by motor 25. While FIG. 3 shows the vacuum line 14 entering space 13 at the top only, a branch line from line 14, not shown in the drawing, could also enter the bottom of space 13 to ensure removal of any trapped air at the top and bottom of space 13. The above description is applicable to a single chamber operation, but our apparatus can also be employed in a multiple chamber production set up, as schematically shown in FIG. 7. In the production set up shown in FIG. 7, door 26 is manually opened and perforated container 5 containing assemblies to be brazed is placed within preheater 27 to be controlled at a temperature below the brazing temperature and in the range of 700° F to 2,300° F. Electrical vacuum valve 28 is opened and preheater 27 is evacuated to the range of $1 \times 10^{-1}$ to $1 \times 10^{-3}$ Toor by vacuum pump 29 which always operates during production. Heat is then supplied to preheater by electrical heating coils as described above in regard to the single chamber operation to raise the temperature of preheater 27 to temperature below the brazing temperature and in the range of 700° F to 2,300° F which depends on the amount of material to be brazed in container 5, the particular metal being brazed, and the particular braze alloy's composition. After a predetermined time, dependent on the factors of work load, metal to be brazed, and braze alloy composition described above, a conventional intervalometer simultaneously causes valve 28 to close and exhaust chamber 27 to the atmosphere; close electrical vacuum valve 35 and exhaust metal solution treating and soaking chamber 33 to the atmosphere close electrical vacuum valve 36 and exhaust brazing chamber 32 to the atmosphere or alternatively to the range $1 \times 10^{-1}$ to $1 \times 10^{-3}$ Torr with doors close electrical valves 37 and 38 and exhaust quenching chamber 34 to the atmosphere; activates an electro-pneumatic valve, not shown in the drawing, connected to activating shafts 30 to raise conventional vacuum seal slide gates 31; activates endless flexible metal belts within each chamber 27, 32, 33, and 34 to carry container 5 to the next processing chamber; opens electrical valve 41; and activates pump 39 and compressor 40 to draw the hot quenching gas from hot gas reservoir 42 through filter 43 to be stored as cool gas in reservoir 44. It takes approximately 10 seconds to transfer container 5 from the center of one chamber to the center of the next chamber, and the container 5 is manually removed from the endless belt as it pushes door 45 open. At the end of the 10-second transfer cycle time, the intervalometer causes the above sequences to be reversed so that vacuum pump 29 produces a vacuum in the range of $1 \times 10^{-1}$ to $1 \times 10^{-3}$ Torr in chambers 27 and 33; vacuum pump 46 produces a vacuum in the range of $1 \times 10^{-1}$ to $1 \times 10^{-7}$ Torr in chamber 32; vacuum pump 47 produces a vacuum in the range of $1 \times 10^{-1}$ to $1 \times 10^{-3}$ Torr in chamber 34; electrical valve 38 is opened to cause quenching gas, such as $CO_2$ or inert gas as described above regarding the single chamber operation, to flow through chamber 35 to hot gas reservoir 42; and to cause heat to be supplied as described in the single chamber operation above so that chamber 27 is controlled to a predetermined temperature in the range of 700° F to 2,300° F, chamber 32 to a particular temperature in the range 900° F to 3,000° F, and chamber 33 to a particular temperature in the range of 700° F to 2,300° F; the particular temperature for each chamber being selected as described above. The temperature of each chamber is monitored by any conventional means such as a thermocouple located within the chamber and connected to a recording device outside of the chamber as described above regarding the single chamber operation.

We wish it to be understood that we do not desire to be limited to the exact details of construction shown and described for obvious modifications will occur to a person skilled in the art.

We claim:

1. An apparatus for joining metal parts together by vacuum, fluxless brazing and gas quenching comprising at least one chamber means adapted to be evacuated, hermetically sealed, and to contain metal parts; said chamber means having a cylindrical configuration and closed at one end and open at the opposite end, cover means adapted to cover the chamber means; said cover means being annular; containing an annular recess on one surface thereof adapted to be evacuated and provide a hermetic seal for said chamber means, said annular recess having a diameter smaller than said chamber means inside diameter; said cover means being adapted to be superimposed on a flange means integral with the open end of said chamber means, said annular recess being adjacent to the flange means. heating system means adapted to elevate the temperature within the chamber means; cooling system means adapted to lower the temperature within the chamber means; vacuum system means adapted to evacuate the chamber means; and quenching system means adapted to lower the temperature of the chamber means and the metal parts within the chamber means 2. The apparatus of claim 1 wherein the cooling system is a coiled conduit surrounding and in contact with the chamber means, said cooling system being adapted to connect to a reservoir containing cooling fluid to be circulated through the cooling system to control the temperature within the chamber means to a predetermined temperature in the range of 700° F to 2,300° F.

3. The apparatus of claim 1 wherein the vacuum system means comprises a first line means connecting a first vacuum pump means and a first exhaust means to said annular recess means, said first vacuum pump means being adapted to provide and maintain a hermetic seal between the cover means and the chamber means, and a second line means connecting a second vacuum pump means and a second exhaust means to the chamber means, said second vacuum pump means being adapted to provide and maintain a vacuum within the chamber means in the range of $1 \times 10^{-4}$ to $1 \times 10^{-7}$ Torr.

4. The apparatus of claim 1 wherein the quenching system comprises a line means having an end connected to an inlet means integral with the chamber means and a line means end opposite to the chamber connected end connected to a quenching gas reservoir containing a gas selected from the group consisting of $CO_2$ and inert gas to be circulated through the chamber means and exhausted to a hot reservoir, said quenching gas being adapted to reduce the temperature within the chamber means from the predetermined temperature in the range of 700° F to 2,300° F to a predetermined temperature in the range of room temperature and less than room temperature.

5. An apparatus for joining metal parts together by vacuum, fluxless brazing and gas quenching comprising chamber means adapted to be evacuated, hermetically sealed, and to contain metal parts; cover means adapted to cover the chamber means; heating system means adapted to elevate the temperature within the chamber means; cooling system means adapted to lower the temperature within the chamber means; vacuum system means adapted to evacuate the chamber means; and quenching system means adapted to lower the temperature of the chamber means and the metal parts within the chamber means; said chamber means includes four chamber means forming an integral vacuum brazing-gas quenching production system comprising a preheat chamber means having a door means connected to one end of the preheat chamber means, said door means being adapted to hermetically seal the preheat chamber means during a preheat cycle, said preheat chamber means being adapted to be heated to a predetermined temperature within a temperature range of 700° F to 2,300° F and to be evacuated within the range of $1 \times 10^{-1}$ to $1 \times 10^{-3}$ Torr; a brazing chamber means located between and integral with the preheat chamber means end opposite to the door means end and a temperature soaking - solution treating chamber means, said brazing chamber means being adapted to be heated to a predetermined temperature within a temperature range of 900° F and 3,000° F and to be evacuated within the range of $1 \times 10^{-4}$ to $1 \times 10^{-7}$ Torr; a temperature soaking - solution treating chamber means located between and integral with the brazing chamber means and a gas quenching chamber means, said temperature soaking - solution treating chamber means being adapted to be heated to a predetermined temperature within a temperature range of 700° F to 2,300° F and to be evacuated within the range of $1 \times 10^{-1}$ to $1 \times 10^{-3}$ Torr; a gas quenching chamber means having a door means connected to one end of the gas quenching chamber means said door means being adapted to hermetically seal the gas quenching chamber means during the gas quenching cycle, said gas quenching means end opposite to the door means and being integral with the temperature soaking - solution treating chamber means, said gas quenching chamber means being adapted to be cooled to a temperature in the range of room temperature and below room temperature and to be evacuated within the range of $1 \times 10^{-1}$ to $1 \times 10^{-3}$ Torr; a first vacuum seal slide gate means disposed between the preheat chamber means and the brazing chamber means, said first slide gate means being adapted to hermetically seal the preheat chamber means and the brazing chamber means during a preheat cycle and a brazing cycle; a second vacuum seal slide gate means disposed between the brazing chamber means and the temperature soaking - solution treating chamber means, said second slide gate means being adapted to hermetically seal the brazing chamber means and the temperature soaking - solution treating chamber means during a brazing cycle and a temperature soaking - solution treating cycle; a third vacuum seal slide gate means disposed between the temperature soaking - solution treating chamber means and the gas quenching chamber means, said third slide gate means being adapted to hermetically seal temperature soaking - solution treating chamber means and the gas quenching chamber means during a temperature soaking - solution treating cycle and a gas quenching cycle; a first heating system means adapted to control the temperature within the preheat chamber means and the temperature soaking - solution treating means within a range of 700° F to 2,300° F during a preheating and temperature soaking - solution treating cycle; a second heating system means adapted to control the temperature within the brazing chamber means within a range of 900° F to 3,000° F during a brazing cycle; a first vacuum pump means connected to the preheat chamber means and the temperature soaking - solution treating chamber means by line means, said first vacuum pump means being adapted to evacuate the preheat chamber means and the temperature soaking - solution treating chamber means within a range of $1 \times 10^{-1}$ to $1 \times 10^{-3}$ Torr during a preheat and a temperature soaking - solution treating cycle; a second vacuum pump means connected to the brazing chamber means by line means, said second vacuum pump means being adapted to evacuate the brazing chamber means within a range of $1 \times 10^{-4}$ to $1 \times 10^{-7}$ Torr during the brazing cycle; a third vacuum pump means connected to the gas quenching chamber means, said third chamber means being adapted to evacuate the gas quenching chamber means within a range of $1 \times 10^{-1}$ to $1 \times 10^{-3}$ Torr during a quenching cycle and to circulate quenching gas selected from the group consisting of $CO_2$ and inert gas from a reservoir means containing said quenching gas through the quenching gas chamber to a hot gas reservoir means during a quenching cycle; a pump means to withdraw gas from the hot gas reservoir means through a gas filter means to a compressor means; a compressor means connected to the pump means by line means, said compressor means being adapted to cool a quantity of gas from the hot gas reservoir means and to transport the cool gas to the quenching gas reservoir means; an electro-pneumatic valve means connected by shaft means to the first, second, and third slide gate means, said valve means being adapted to open and close said gate means; a first electrical valve means disposed between the first vacuum pump means and the preheat chamber means, said first electrical valve means being adapted to provide evacuation and exhaustion of the preheat chamber; a second electrical valve means disposed between the first vacuum pump means and the temperature soaking - solution treating chamber means, said second electrical valve means being adapted to provide evacuation and exhaustion of the temperature soaking - solution treating chamber; a third electrical valve means disposed between the second vacuum pump means and the brazing chamber means, said third electrical valve means being adapted to provide evacuation and exhaustion of the brazing chamber means; a fourth electrical valve means disposed between the quenching gas reservoir means and the quenching gas chamber means, said fourth electrical valve means being adapted to start and stop gas flow to the quenching gas chamber means; a fifth electrical valve means disposed between the quenching gas chamber means and the third vacuum pump means, said fifth electrical valve means being adapted to evacuate and exhaust the quenching gas chamber means; a sixth electrical valve means disposed between the compressor means and the quenching gas reservoir means, said sixth electrical valve means being adapted to start and stop flow of cool gas from the compressor means to the quenching gas reservoir means; an endless belt means located within each chamber means, said belt means being motor activated to transport the metal parts from chamber to chamber; and an intervalometer means to control the sequenching of events within the integral production system.

* * * * *